US010452285B2

United States Patent
Goodman et al.

(10) Patent No.: US 10,452,285 B2
(45) Date of Patent: *Oct. 22, 2019

(54) STORAGE SYSTEM BASED HOST COMPUTER MONITORING

(71) Applicant: INTERNATIONAL BUSINESS MACHINES CORPORATION, Armonk, NY (US)

(72) Inventors: Daniel I. Goodman, Beit Shemesh (IL); Avihu Turzion, Givat Avni (IL); Rohit Krishna Prasad, Cedar Park, TX (US); Ravi A. Shankar, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/065,737

(22) Filed: Oct. 29, 2013

(65) Prior Publication Data
US 2014/0223123 A1    Aug. 7, 2014

Related U.S. Application Data

(63) Continuation of application No. 13/759,219, filed on Feb. 5, 2013.

(51) Int. Cl.
*H04L 29/08* (2006.01)
*H04L 29/06* (2006.01)
(Continued)

(52) U.S. Cl.
CPC ............ *G06F 3/0619* (2013.01); *G06F 3/065* (2013.01); *G06F 3/067* (2013.01);
(Continued)

(58) Field of Classification Search
CPC .............. H04L 67/322; H04L 67/1097; H04L 29/08549; H04L 43/0817; H04L 12/2602;
(Continued)

(56) References Cited

U.S. PATENT DOCUMENTS 6,601,187 B1 * 7/2003 Sicola ................. G06F 11/2071
711/162
6,934,878 B2 * 8/2005 Massa ................. G06F 11/0727
714/5.11
(Continued)

FOREIGN PATENT DOCUMENTS

WO    WO2010046393 A2    4/2010

OTHER PUBLICATIONS

Data Center Architecture Overview, Cisco Data Center Infrastructure 2.5 Design Guide, retrieved from http://www.cisco.com/en/US/docs/solutions/Enterprise/Data_Center/DC_Infra2_5/DCInfra_1.html , Jan. 24, 2011, 6 pages.

*Primary Examiner* — Kamal B Divecha
*Assistant Examiner* — Clifton Houston
(74) *Attorney, Agent, or Firm* — Griffiths & Seaton PLLC

(57) ABSTRACT

Methods, apparatus and computer program products implement embodiments of the present invention that include establishing, by a storage system coupled to a first host computer via a storage area network (SAN), metrics indicating a status of the first host computer, and storing the indicated metrics to the storage system. A second host computer, coupled to the storage system via the storage area network, determines an availability of the first host computer based on the metrics.

4 Claims, 3 Drawing Sheets

(51) Int. Cl.
*G06F 11/00* (2006.01)
*G06F 3/06* (2006.01)
*G06F 11/07* (2006.01)
*G06F 11/30* (2006.01)
*H04L 12/26* (2006.01)
*G06F 11/34* (2006.01)

(52) U.S. Cl.
CPC ...... *G06F 11/0751* (2013.01); *G06F 11/3031* (2013.01); *G06F 11/3055* (2013.01); *H04L 67/1097* (2013.01); *H04L 67/322* (2013.01); *G06F 11/00* (2013.01); *G06F 11/3476* (2013.01); *G06F 2201/81* (2013.01); *H04L 29/08549* (2013.01); *H04L 43/08* (2013.01)

(58) Field of Classification Search
CPC ............ H04L 12/2642; H04L 12/2692; H04L 12/2818; H04L 41/0253; H04L 43/00; H04L 43/08; H04L 43/0876; H04L 43/10; H04L 47/10; H04L 47/11; H04L 47/20; H04L 67/025; H04L 67/22; H04L 67/42; G06F 3/0619; G06F 3/067; G06F 3/065; G06F 11/00; G06F 11/0709; G06F 11/0712; G06F 11/0748; G06F 11/0781; G06F 11/3006; G06F 11/3055; G06F 11/3065; G06F 11/301
See application file for complete search history.

(56) References Cited

U.S. PATENT DOCUMENTS

| | | | | |
|---|---|---|---|---|
| 7,428,210 B2* | 9/2008 | Saika | ............ | H04L 41/0663 370/217 |
| 7,543,174 B1* | 6/2009 | van Rietschote | ... | G06F 11/2025 709/223 |
| 7,822,841 B2* | 10/2010 | Franklin | ............ | H04L 41/044 705/6 |
| 8,281,071 B1* | 10/2012 | Vohra | ............ | H04L 67/1097 711/114 |
| 9,195,528 B1* | 11/2015 | Sarda | ............ | G06F 11/00 |
| 9,319,267 B1* | 4/2016 | Buchko | ............ | H04L 41/0663 |
| 2005/0097394 A1* | 5/2005 | Wang | ............ | G06F 11/2025 714/11 |
| 2005/0188161 A1* | 8/2005 | Taguchi | ............ | G06F 3/0622 711/152 |
| 2006/0090163 A1* | 4/2006 | Karisson | ............ | G06F 11/3409 718/105 |
| 2007/0033447 A1* | 2/2007 | Fujibayashi | ............ | G06F 11/0727 714/47.2 |
| 2007/0157300 A1* | 7/2007 | Sivaradjane | ............ | H04L 63/1458 726/9 |
| 2008/0126615 A1* | 5/2008 | Sinclair | ............ | G06F 11/201 710/38 |
| 2010/0042752 A1* | 2/2010 | Helman | ............ | G06F 3/0604 710/11 |
| 2011/0022711 A1* | 1/2011 | Cohn | ............ | G06F 9/5061 709/225 |
| 2011/0055375 A1* | 3/2011 | Heim | ............ | G06F 11/0709 709/224 |
| 2012/0039331 A1* | 2/2012 | Astigarraga | ............ | H04L 45/42 370/389 |
| 2012/0066449 A1* | 3/2012 | Colgrove | ............ | G06F 3/061 711/114 |
| 2013/0042323 A1* | 2/2013 | Narayanaswamy | ............ | H04L 63/1408 726/23 |
| 2013/0086644 A1* | 4/2013 | Bahn | ............ | H04L 12/2818 726/4 |
| 2013/0144930 A1* | 6/2013 | Tahara | ............ | H04L 29/08072 709/201 |

* cited by examiner

STORAGE SYSTEM BASED HOST COMPUTER MONITORING

FIELD OF THE INVENTION

The present invention relates generally to data storage, and specifically to determining an availability of a host computer based on connectivity metrics retrieved from a storage system.

BACKGROUND

When executing a mission critical application (e.g., a web server or a database server) in a computer facility comprising a cluster of multiple host computers, there is typically a first host computer that is configured as a primary host and second host computer is configured as a secondary host. In some configurations, there may be multiple secondary host computers. In operation, the secondary host computer monitors the status of the of the primary host computer, and if the secondary host detects (with a high confidence) that the primary host is either down or non-responsive, the secondary host computer can take over the responsibilities of the primary host and begin functioning as the primary host.

SUMMARY

There is provided, in accordance with an embodiment of the present invention a method, including establishing, by a storage system coupled to a first host computer via a storage area network (SAN), metrics indicating a status of the first host computer, storing the indicated metrics to the storage system, and determining, by a second host computer coupled to the storage system via the storage area network, an availability of the first host computer based on the metrics.

There is also provided, in accordance with an embodiment of the present invention a storage system, including a first host computer, a storage system coupled to a first host computer via a storage area network (SAN) and configured to establish metrics indicating a status of the first host computer, and to store the indicated metrics to the storage system, and a second host computer coupled to the storage system via the storage area network and configured to determine an availability of the first host computer based on the metrics.

There is further provided, in accordance with an embodiment of the present invention a computer program product, the computer program product including a non-transitory computer readable storage medium having computer readable program code embodied therewith, the computer readable program code including computer readable program code configured to establish, by a storage system coupled to a first host computer via a storage area network (SAN), metrics indicating a status of the first host computer, computer readable program code configured to store the indicating metrics to the storage system, and computer readable program code configured to determine, by a second host computer coupled to the storage system via the storage area network, an availability of the first host computer based on the metrics.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Internet protocol (IP) connections typically comprise multiple segments, where data packets transmitted by a source computer to a target computer are serially forwarded through the multiple segments until reaching the destination. Therefore, if a secondary host computer uses an IP ping test (a computer network administration utility used to test the reachability of a host on an IP network) to determine a status of a primary host computer, a ping test failure can be the result of either a failure of the primary host or bad network connectivity between the primary and the secondary host computers.

In other words, using an IP ping test to determine the status of a primary host may result in false negatives, since while the primary host may be functioning correctly, there may be a failure of a network segments located between the primary and the secondary hosts. The greater the distance between the primary and the secondary hosts, and the greater the number of network segments (and their corresponding hardware elements) between the two hosts, the higher the probability of false negatives. In some configurations, computer facilities may include a third party (i.e., software and/or hardware) that the secondary host can communicate with in order to determine (with high confidence) if a ping test failure is due to a network connectivity (also referred to herein as storage connectivity) issue or a failure of the primary host.

Embodiments of the present invention provide methods and systems for a secondary host computer to determine the status of a primary host computer and network connectivity (since storage can be external to the host computers) based on storage connectivity metrics. In some embodiments, the primary and the secondary host computers are coupled to a storage system via a switched fabric storage area network (SAN) such as Fibre Channel. In operation, the storage system can be configured to establish, via the SAN, metrics that indicate a status of the primary host computer, and the secondary host computer can be configured to determine an availability of the primary host computer based on the metrics stored on the storage system.

As explained in detail hereinbelow, the metrics may comprise passive metrics, active metrics or a challenge response. When determining the availability of the primary host computer, the metrics may comprise an operational status of the primary host computer (e.g., a hardware and/or software status) or a connectivity status between the primary host computer and the storage system (e.g., a status of the SAN connection). Since the metrics may help pinpoint the source of any problems with the operation of the primary host computer, embodiments of the present invention can help system administrators maintain mission critical systems more effectively.

System Description

Figure 1:
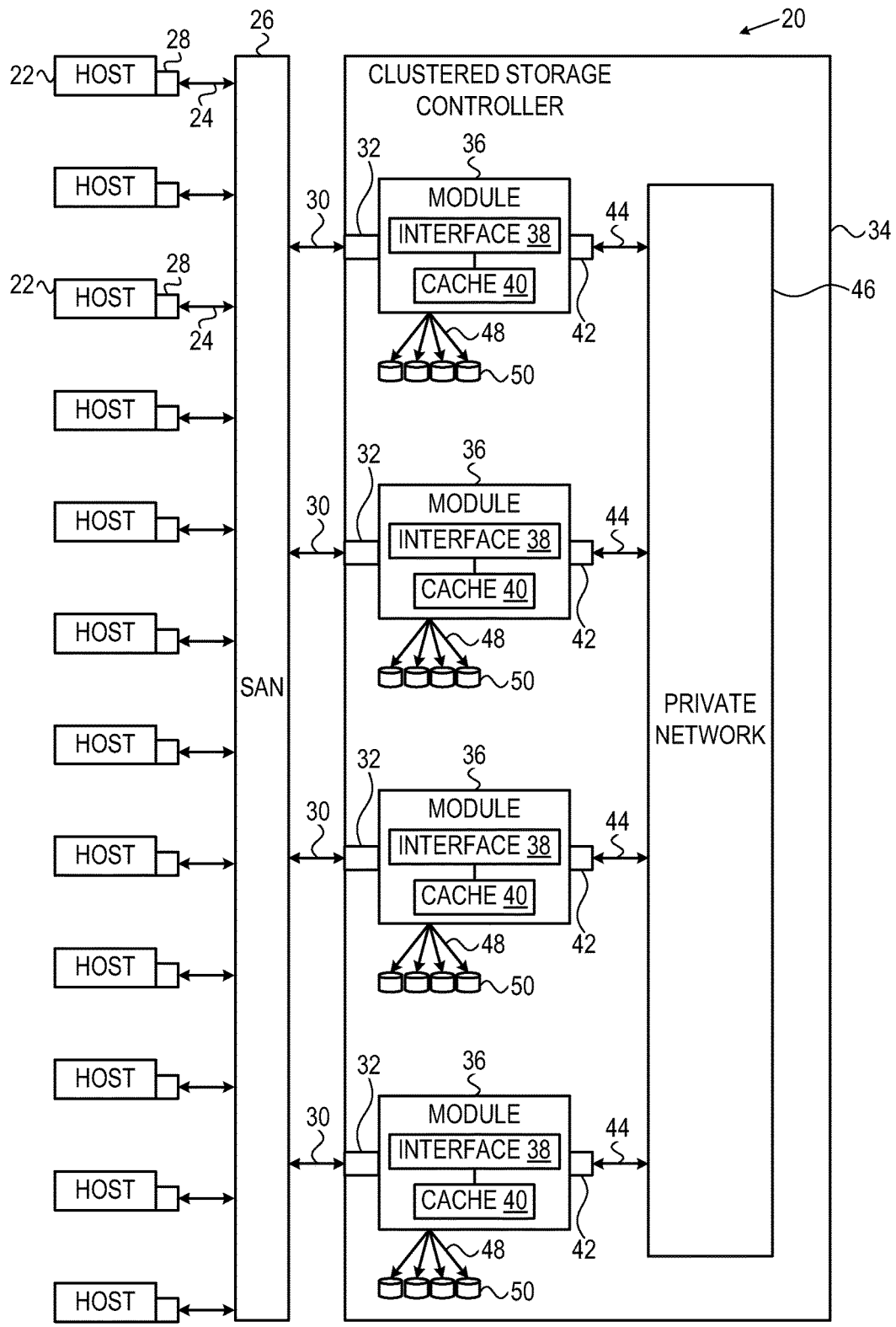
FIG. 1 is a schematic pictorial illustration of a storage system, in accordance with an embodiment of the present invention.

FIG. 1 is a schematic pictorial illustration of a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
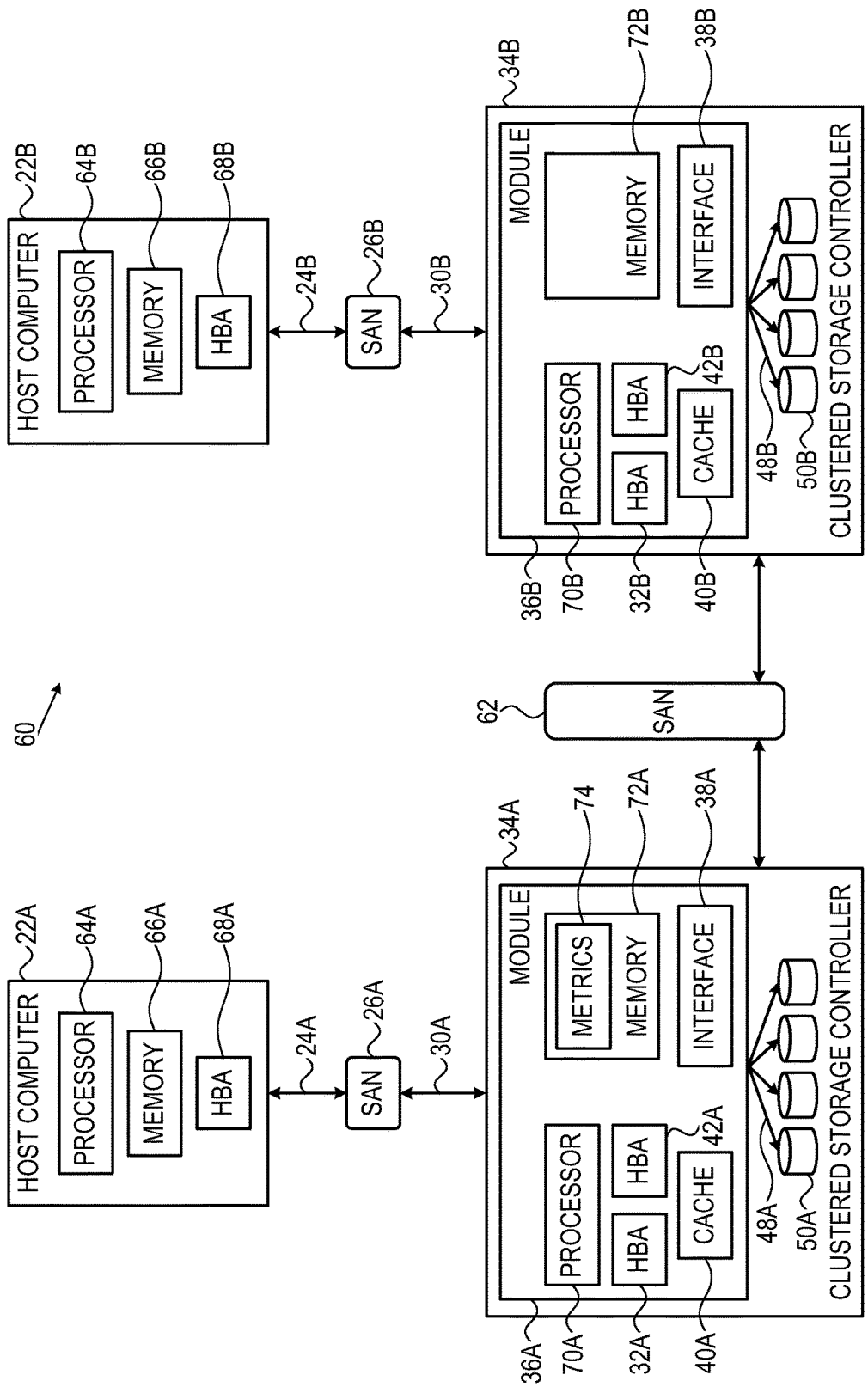
FIG. 2 is a schematic pictorial illustration of a facility configured to monitor the status of a given host computer, in accordance with an embodiment of the present invention.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIGS. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Host Monitoring

Figure 3:
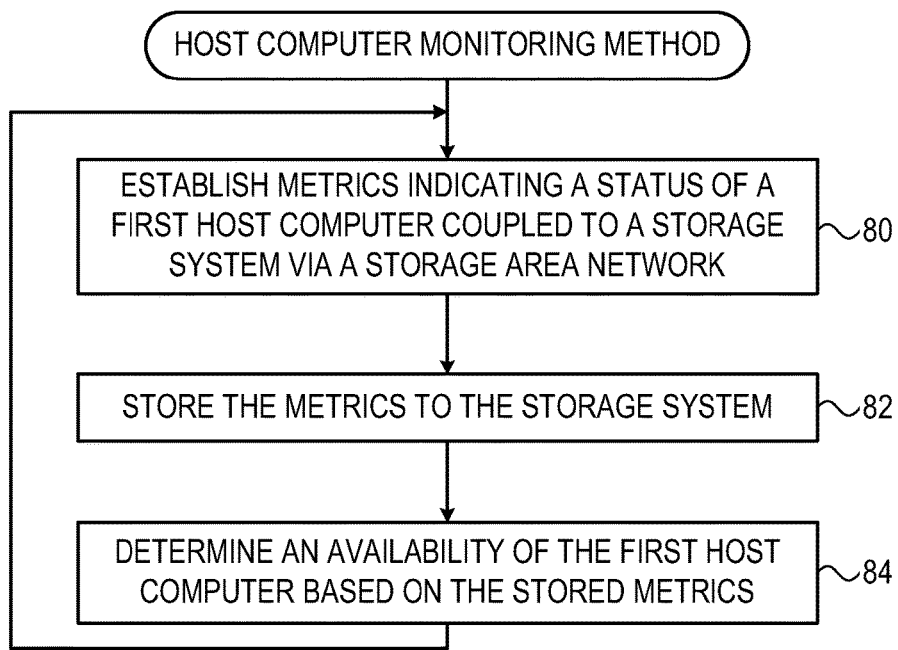
FIG. 3 is a flow diagram that schematically illustrates a method of monitoring the status of the given host computer, in accordance with an embodiment of the present invention.

FIG. 3 is a flow diagram that schematically illustrates a method of host computer 22B monitoring host computer 22A via clustered storage controller 34A, in accordance with an embodiment of the present invention. In an initial step 80, processor 70A establishes metrics 74 that indicate a status of host computer 22A, and in a storage step 82, the processor stores the metrics to memory 72A. Alternatively, processor 70A can store metrics 74 to a given storage device 50A. The metrics established by processor 70A may comprise passive metrics, active metrics or a challenge response.

Passive metrics may comprise metrics that processor 70A establishes by monitoring I/O traffic and summarizing I/O requests between host computer 22A and module 36A. Examples of passive metrics include, but are not limited to:
- The number of I/O requests received from host computer 22A.
- The amount of data transferred between host computer 22A and module 36A.
- A quality of service of SAN 26A that couples host computer 22A to module 36A. As described supra, SAN 26A may comprise a switched fabric network (e.g., Fibre Channel) that enables multiple paths to be defined between host computer 22A and module 36A. The quality of service may comprise a current number of active paths between host 22A and module 36A.

An active metric may comprise a timestamp that is updated when processor 70A receives a specific message from processor 64A indicating the host computer 22A is still active. In some embodiments, processor 64A can be configured to convey the specific message at specified intervals (e.g., every 30 seconds).

A challenge response may comprise data conveyed by processor 64A to processor 70A responsively to a challenge (i.e., a question) message conveyed by processor 70A to processor 64A, the challenge message conveyed in response to a challenge request conveyed by processor 64B to processor 70A. In other words, if host 22B wants to check the status of host 22A, processor 64B conveys a challenge request to clustered storage controller 34A. In response to the challenge request, processor 70A conveys a challenge message to processor 64A. Upon receiving a challenge response from processor 64A, processor 70A updates metrics 74 accordingly.

In some embodiments, the challenge message may comprise a calculation question or a status question. Examples of challenge messages include but are not limited to:
- A utilization percentage of processor 64A and/or memory 66A.
- A defined calculation. For example, the challenge request conveyed by processor 64B to processor 70A may a numeric key. Processor 70A responsively conveys the key to processor 64A, which then calculates an XOR of the key and a predetermined value and then conveys the calculated value back to the processor 70A. Processor 70A can then store the received calculated value to metrics 74.

In a determination step 84, processor 64B retrieves metrics 74 from module 36B, and determines an availability of host 22A based on the retrieved metrics, and the method continues with step 80. For example, host 22A may be configured as a primary host computer, executing a web server application (not shown) on processor 64A, and host 22B may be configured as a secondary host computer, also executing a web server application (not shown) on processor 64B. As primary host computer 22A handles web requests, secondary host computer 22B can monitor the status of host 22A using the embodiments described herein.

If metrics 74 indicate that the performance of primary host computer 22B is below a specified threshold, then secondary host computer 22B can take over the role of the primary host computer. For example, if the host computer 22A has failed, then host computer 22B can (unilaterally) take over as the primary host. However, if host computer 22A is "underperforming" (i.e., as indicated by metrics 74), then host computer 22B can notify host computer 22A that host computer 22B is now replacing host computer 22A as the primary host.

In the configuration shown in FIG. 2 (i.e., where the primary and the secondary computers are coupled to different storage controllers), upon assuming the role of the primary host computer, host computer 22B can convey a message to storage controller 34A that host computer 22B (and storage controller 34B) is now configured as the primary site.

Using the passive metrics, active metrics and challenge responses described supra, examples of specified thresholds that indicate the performance of host computer 22A include:
- The number of I/O requests processor 70A receives from host computer 22A during a defined time period (i.e. a sliding window) falls below a specific number.
- The amount of data transferred between module 36A and host computer 22A during a defined time period falls below a specified amount.
- The number of paths in SAN 26A that are currently active between module 36A and host computer 22A falls below a specified number. For example, while SAN 26A may be configured to have eight paths between host computer 22A and module 36A, metrics 74 may indicate that there only four of the paths are currently active.
- The last time processor 64A conveyed a timestamp.
- The utilization of processor 64A and/or memory 66A rising above a specified percentage (challenge message).
- A correct/incorrect challenge response (or no response) received, where the challenge message comprises a key value for a defined calculation.

Using the timestamp metric described supra, the following table lists sample management commands that host computer 22A (referred in the management commands as node 22A) executes to update the timestamp:

```
loop_forever:
    # set my ping_timestamp value to be the
    # output from the current_time( ) command
    storage_contoller.set_object_metadata(
        object='node22A',
        type='host',
        key='ping_timestamp',
        value= current_time( ));
    sleep(threshold/2) # update at half threshold period;
```

If the configuration of facility 60 comprises host computers 22A and 22B both coupled to a single storage controller (i.e., a single storage controller configuration) host computer 22B (referred to in the management commands as node 22B) retrieves the timestamp of host computer 22A using the following management commands:

```
last_time_stamp = storage_controller.get_object_metadata(
    object='node22A',
    type='host',
    key='ping_timestamp');
```

```
if (current_time( ) - last_time_stamp) > threshold:
    # host is down, fail over
```

As shown in FIG. 2, host computer 22B may not be physically connected (i.e., directly) to storage controller 34A. Starting with version 10.1.0.c (Gen2), XIV™ storage controllers from International Business Machines (IBM) Corporation (Armonk, N.Y.) support a Remote Target Command that enables, via an application programming interface (API), host computer 22B to execute management commands on clustered storage controller 34A.

If facility 60 is configured as in FIG. 2, where host computer 22B monitors host computer 22A as a "remote target," then the following management commands enables host computer 22B to execute commands on storage controller 34A (i.e., which is coupled to host computer 22A):

```
last_time_stamp = sc_34B.get_object_metadata(
    object='nodeA',
    type='host',
    key='ping_timestamp',
    remote_target='sc_34A');
if (current_time( ) - last_time_stamp) > threshold:
    # host is down, fail over;
```

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of monitoring a host computer by one or more other host computers via one or more storage controllers, comprising:

establishing, by a first storage system coupled to a first host computer operating as a primary host executing a web server application via a first storage area network (SAN) wherein the first storage system comprises a separate and complete computing system entity including one or more storage devices and a first storage controller controlling the first host computer, metrics indicating a status of the first host computer by identifying a quality of service of the first SAN coupling the first host computer and the first storage system, wherein the quality of service comprises a current number of active paths between the first host computer and the first storage system;

storing the established metrics to the first storage system;

retrieving, by a second host computer coupled to a second storage system including one or more storage devices and a second storage controller via a second SAN, the established metrics from the first storage system via the second storage controller, wherein the second host computer operates as a secondary host executing the web server application and is controlled by the second storage controller, and wherein the first storage system is coupled to the second storage system via a third SAN;

evaluating, by the secondary host, the performance of the first host computer operating as the primary host using the retrieved established metrics; and determining, by the secondary host, an availability of the first host computer based on the retrieved established metrics;

wherein establishing the metrics comprises collecting passive metrics including monitoring input/output traffic and summarizing input/output requests comprising an amount of data conveyed by the first host computer to the first storage system, and collecting active metrics by receiving a challenge response conveyed by the first host computer, the challenge response conveyed in response to a challenge message conveyed by the first storage controller to the first host computer, and the challenge message conveyed by the first storage controller to the first host computer in response to a challenge request conveyed by the second host computer to the first storage controller, wherein the challenge response is determined by calculating an exclusive OR (XOR) of a numeric key and a predetermined value included in the challenge request, wherein the second host computer operating as the secondary host monitors the primary host as the primary host handles web requests received by the web server application, and takes over responsibility operating as the primary host and thus takes over handling of the web requests received by the web server application when it is determined the established metrics do not meet a predetermined threshold performance level; and wherein, upon taking over responsibility operating as the primary host the second host computer conveys a message to the first storage controller that the second host computer operating under the second storage controller are configured as the primary host, and wherein the first, the second, and the third SAN comprises a Fiber Channel network.

2. The method according to claim 1, wherein establishing the metrics comprises receiving a specific periodic notification conveyed by the first host computer to the first storage system.

3. The method according to claim 1, wherein the status comprises a connectivity status between the first host computer and the first storage system.

4. The method according to claim 1, wherein the status comprises an operational status of the first host computer.

* * * * *